C. SELLENSCHEIDT.
FILTER.
APPLICATION FILED DEC. 24, 1907.
947,856.
Patented Feb. 1, 1910.
Fig. 1.
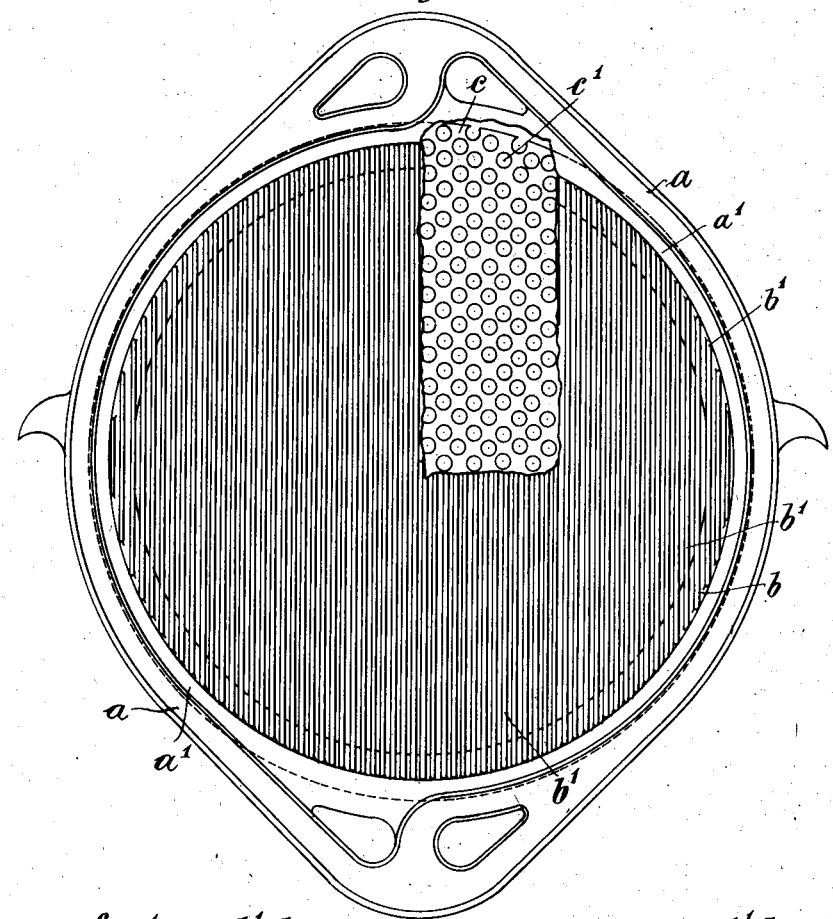
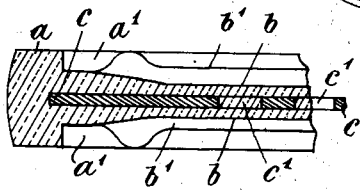
Fig. 2.
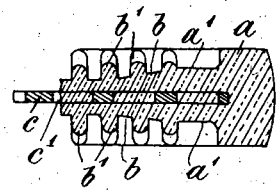
Fig. 3.

UNITED STATES PATENT OFFICE.

CARL SELLENSCHEIDT, OF BERLIN, GERMANY.

FILTER.

947,856.  Specification of Letters Patent.  Patented Feb. 1, 1910.

Application filed December 24, 1907. Serial No. 407,941.

*To all whom it may concern:*

Be it known that I, CARL SELLENSCHEIDT, a citizen of Germany, residing at Berlin, Germany, have invented new and useful Improvements in Filters, of which the following is a specification.

In filters of various kinds for treating beer and other liquids experiments have been made with india-rubber for the frame of the filter plates, with a view to preventing the liquid from coming in contact with metal whereby its taste and keeping-quality, etc., are detrimentally affected.

According to my invention I employ rubber not only for the actual frame, but also for the parts located within the latter and which serve to support adjacent filtering-layers or to receive the filtering-cloths, etc. In this manner the liquid only comes in contact with the neutral india-rubber. Instead of rubber, paper or papery material or other neutral substance capable of being pressed may be used.

The rubber or like filter plate is preferably furnished with a metal disk or plate extending over the entire area of the inner part, for the purpose of stiffening it. Such disk may be perforated in order to increase the elasticity of the whole structure and to constitute a connection between the two layers of material on each side of the disk.

One form of construction of the new device is illustrated in the accompanying drawing.

Figure 1 is a plan of the filter plate, a fragment of the surface of the inner member being removed to display the underlying metal disk. Fig. 2 is an enlarged section through a portion of the plate, taken parallel to the ribs. Fig. 3 is an enlarged section through the same, taken transversely of the ribs.

Externally the filtering-body or plate presents the form of a so-called grid of a filter-press. It consists essentially of a frame, $a$, and an interior part, $b$, furnished with ribs, $b^1$. This plate consists entirely of rubber or equivalent material, except that in the interior there is located a metal disk $c$ of uniform thickness and having substantially flat opposite surfaces which extend over the whole area of the said inner portion. This disk, $c$, is perforated, the cylindrical or stud-shaped pieces of material which force themselves through the holes $c^1$ constituting a connection between the layers of material on each side. The two opposite layers of the compressible material, being thus joined and held to the faces of the disk, are preferably united together around the margin of the disk, forming an outer frame for the filter member which is relatively thicker and hence more resilient than the rest or central part of the filter member. The liquid is prevented from passing from one side to the other, which has the advantage in filter presses that the particles of the mass are less liable to be carried along. The liquid distributes itself and collects in the annular channel $a^1$, into which the grooves between the ribs $b^1$ conduct.

As it is desired that the pressure of the filter member against the layer of filtering material, be confined to the region of its periphery, the several ribs are made of less height than the frame portion, throughout the central region of the plate, but are of substantially the same height, as shown in Figs. 2 and 3, in the neighborhood of the collecting channel, at which points they exert a tightening effect on the edges of the filtering layer.

Having thus described my invention, what I claim as new and desire to secure by Letters Patent of the United States is—

1. A filter member consisting of a plate having a surface of a neutral material to be presented to the liquid under treatment and formed of an outer frame portion and an inner ribbed portion with a collecting channel therebetween, the ribs of said inner portion being centrally of less height than the frame portion but rising to such height as they approach the said collecting channel.

2. A filter member comprising an interior substantially flat metal plate of uniform thickness, embedded in and covered by opposite layers of a compressible material of a neutral character, the said layers being united around the margin of said disk and forming a relatively thicker frame to said filter member.

In testimony whereof I have signed my name to this specification in the presence of two subscribing witnesses.

CARL SELLENSCHEIDT.

Witnesses:
WOLDEMAR HAUPT,
HANS HEIMANN.